UNITED STATES PATENT OFFICE.

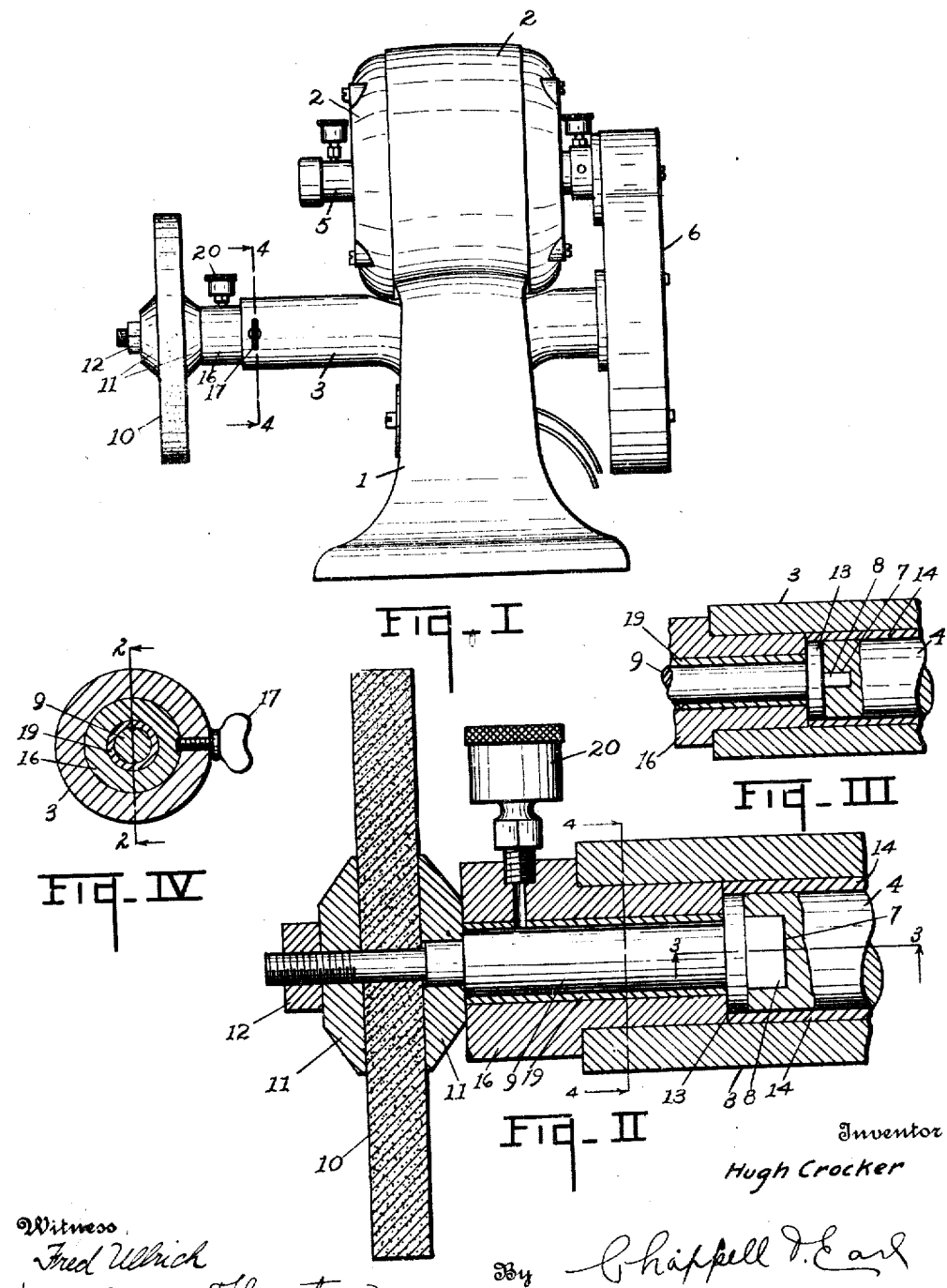

HUGH CROCKER, OF KALAMAZOO, MICHIGAN.

EMERY-WHEEL ATTACHMENT FOR MEAT-GRINDERS.

1,286,948.  Specification of Letters Patent.  Patented Dec. 10, 1918.

Application filed December 19, 1917. Serial No. 207,899.

*To all whom it may concern:*

Be it known that I, HUGH CROCKER, a citizen of the United States, residing at the city and county of Kalamazoo and State of Michigan, have invented certain new and useful Improvements in Emery-Wheel Attachments for Meat-Grinders, of which the following is a specification.

This invention relates to improvements in emery wheel attachments for meat grinders.

The main object of this invention is, to provide an improved emery wheel attachment for meat grinders which may be readily interchanged with the meat grinder.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side view of a structure embodying the features of my invention.

Fig. II is an enlarged detail view partially in section on a line corresponding to line 2—2 of Fig. IV.

Fig. III is a detail view partially in section on a line corresponding to line 3—3 of Fig. II.

Fig. IV is a transverse section on a line corresponding to line 4—4 of Fig. I.

In the drawing, similar reference characters refer to similar parts throughout the several views, and the sectional views are taken looking in the direction of the little arrows at the ends of the section lines.

Referring to the drawing, 1 represents a base or pedestal and 2 an electric driving motor mounted thereon. Below the motor is a tubular housing 3 for the driven shaft 4. One end of this shaft 4 is connected to the driving shaft 5 of the motor by gearing, not shown, inclosed within the housing 6. The other end of the shaft 4 terminates within the housing and in a spaced relation to its end. The driving shaft has a transverse slot 7 therein adapted to receive the driving tang 8 of the spindle 9.

The emery wheel 10 is clamped upon the spindle between the plates 11, the end of the spindle being threaded to receive the nut 12. The spindle is provided with a flange-like collar 13 at its inner end adapted to abut the end of the shaft 4, the collar being of the same diameter as the shaft 4 so that it fits within the shaft bearing bushing 14. The spindle bearing 16 is arranged with its inner end abutting the collar 13. The spindle bearing is adapted to fit within the housing and is removably secured therein by means of the set-screw 17. The bearing is preferably shouldered at 18 to engage the end of the shaft housing. The spindle bearing is preferably provided with a bushing 19 and with an oil cup 20.

With the parts thus arranged, the meat grinder may be removed and an emery wheel inserted so that a convenient means is provided for grinding knives, cleavers or other butcher's implements.

The meat grinder is provided with suitable means for detachably securing it in position but as such details form no part of my present invention I have not illustrated the same herein.

Having thus described my invention, what I claim as new and desire to secure by Letters Patent, is:

1. The combination with a base, of a tubular shaft housing, a shaft arranged in said housing, one end of said shaft terminating within said housing in a spaced relation to the end thereof and having a slot therein adapted to receive a driving tang of a spindle, an emery wheel, a spindle to which said emery wheel is secured having a driving tang at its inner end engageable in said slot in the end of said shaft, and a collar abutting the end of said shaft, said shaft housing being provided with a shaft bearing bushing embracing said spindle collar, and a bearing for said spindle arranged with its inner end engaging said collar, said bearing being adapted to be inserted in the end of said housing and shouldered to engage the same, and means for removably securing said bearing in said bushing.

2. The combination with a base of a shaft housing, a shaft arranged in said housing with one end terminating within said housing in a spaced relation to the end thereof and adapted to receive the end of a spindle, an emery wheel, a spindle to which said emery wheel is secured adapted at its inner end for removable driving engagement with said shaft, and a bearing for said spindle, said bearing being adapted to be inserted in the end of said housing, and means for securing said bearing in said housing.

In witness whereof, I have hereunto set my hand and seal in the presence of two witnesses.

HUGH CROCKER. [L. S.]

Witnesses:
LUELLA G. GREENFIELD,
MARGARET L. GLASGOW.